US010796348B2

(12) United States Patent
Krishnaswamy et al.

(10) Patent No.: US 10,796,348 B2
(45) Date of Patent: Oct. 6, 2020

(54) DATA RESILIENCY OF BILLING INFORMATION

(71) Applicant: International Business Machines Corporation, Armonk, NY (US)

(72) Inventors: Dilip Krishnaswamy, Bangalore (IN); Vinay G. Rajagopal, Yelahanka New Town (IN); Rohit Shetty, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 15/136,436

(22) Filed: Apr. 22, 2016

(65) Prior Publication Data

US 2017/0308935 A1 Oct. 26, 2017

(51) Int. Cl.
*G06Q 30/04* (2012.01)
*H04L 12/14* (2006.01)
*H04M 15/00* (2006.01)
*H04L 29/08* (2006.01)

(52) U.S. Cl.
CPC ............ *G06Q 30/04* (2013.01); *H04L 12/14* (2013.01); *H04M 15/00* (2013.01); *H04M 15/31* (2013.01); *H04M 15/70* (2013.01); *H04M 15/73* (2013.01); *H04M 15/74* (2013.01); *H04L 67/1095* (2013.01); *H04L 67/32* (2013.01)

(58) Field of Classification Search
CPC ......... G06Q 30/04; H04L 12/14; H04L 47/56; H04L 47/624; H04L 47/6275; H04L 67/1095; H04L 67/32; H05K 999/99
See application file for complete search history.

(56) References Cited

U.S. PATENT DOCUMENTS

| | | | | |
|---|---|---|---|---|
| 5,283,829 A * | 2/1994 | Anderson | .............. | G06Q 20/00 235/379 |
| 5,832,460 A * | 11/1998 | Bednar | .................. | G06Q 20/04 705/27.2 |
| 6,463,275 B1 * | 10/2002 | Deakin | ................. | H04M 15/00 455/406 |
| 6,775,267 B1 * | 8/2004 | Kung | ..................... | H04L 12/14 370/352 |

(Continued)

FOREIGN PATENT DOCUMENTS

| | | |
|---|---|---|
| CN | 103313223 A | 9/2013 |
| EP | 2477427 B1 | 3/2013 |

OTHER PUBLICATIONS

Hernandez, A., & Magana, E. (Jan. 22, 2008). One-way Delay Measurement and Characterization. Retrieved from IEEE Xplore Digital Library: https://ieeexplore.ieee.org/abstract/document/4438363/authors#authors. (Year: 2008).*

(Continued)

*Primary Examiner* — Fahd A Obeid
*Assistant Examiner* — Michael Jared Walker
(74) *Attorney, Agent, or Firm* — Daniel R. Simek

(57) ABSTRACT

Managing transaction data during times of low network connectivity by organizing billing information for prioritized processing during periods of higher network connectivity. During low connectivity events, billing information is organized based, at least in part, on a combination of age and revenue to communicate important billing information upon reconnection.

20 Claims, 2 Drawing Sheets

(56) References Cited

U.S. PATENT DOCUMENTS

| | | | | |
|---|---|---|---|---|
| 7,127,524 | B1* | 10/2006 | Renda | H04L 29/12 709/245 |
| 7,155,412 | B2* | 12/2006 | Brown | G06Q 20/102 705/40 |
| 7,263,597 | B2* | 8/2007 | Everdell | H04L 47/10 709/201 |
| 7,778,972 | B1* | 8/2010 | Cormie | G06F 17/30094 707/626 |
| 8,024,600 | B2* | 9/2011 | Sciacca | G06F 9/5083 714/11 |
| 8,290,865 | B2* | 10/2012 | Lawrence | G06Q 20/02 705/30 |
| 8,438,298 | B2* | 5/2013 | Arai | G06F 8/65 709/203 |
| 8,630,947 | B1* | 1/2014 | Freund | G06Q 10/109 705/40 |
| 8,887,056 | B2 | 11/2014 | Breternitz et al. | |
| 8,903,779 | B1* | 12/2014 | Holenstein | G06F 11/1469 707/685 |
| 9,167,104 | B2* | 10/2015 | Dabbiere | H04M 15/885 |
| 9,202,084 | B2* | 12/2015 | Moore | G06F 21/6245 |
| 9,226,155 | B2* | 12/2015 | Dabbiere | H04W 76/10 |
| 9,262,231 | B2* | 2/2016 | Breternitz | H04L 67/1008 |
| 9,443,268 | B1* | 9/2016 | Kapczynski | G06Q 40/025 |
| 9,838,320 | B2* | 12/2017 | Agarwal | H04L 47/215 |
| 2001/0025301 | A1* | 9/2001 | Anderson | H04L 12/2856 709/207 |
| 2002/0019808 | A1* | 2/2002 | Sharma | G06Q 20/02 705/40 |
| 2002/0077976 | A1* | 6/2002 | Meyer | G06Q 20/04 705/40 |
| 2002/0120741 | A1* | 8/2002 | Webb | G06F 11/3093 709/225 |
| 2002/0152305 | A1* | 10/2002 | Jackson | H04L 41/5035 709/224 |
| 2002/0156834 | A1* | 10/2002 | Kitada | G06F 17/30011 709/203 |
| 2003/0236745 | A1* | 12/2003 | Hartsell | G06Q 20/102 705/40 |
| 2004/0138897 | A1* | 7/2004 | Eapen | G06Q 10/06 705/7.12 |
| 2005/0047379 | A1* | 3/2005 | Boyden | H04B 1/7163 370/338 |
| 2005/0080736 | A1* | 4/2005 | Dent | G06Q 20/04 705/40 |
| 2007/0198354 | A1* | 8/2007 | Senghore | B01J 23/6562 705/14.32 |
| 2007/0282951 | A1* | 12/2007 | Selimis | H04L 67/06 709/205 |
| 2008/0046364 | A1* | 2/2008 | Hall | G06Q 20/10 705/40 |
| 2009/0037287 | A1* | 2/2009 | Baitalmal | G06F 21/128 705/27.1 |
| 2009/0037303 | A1* | 2/2009 | Kelly | G06Q 20/042 705/30 |
| 2009/0037452 | A1* | 2/2009 | Baitalmal | G06F 17/30575 |
| 2009/0138394 | A1* | 5/2009 | Garrison | G06Q 20/04 705/35 |
| 2009/0302103 | A1* | 12/2009 | Kolinski-Schultz | G06Q 20/04 235/379 |
| 2010/0042537 | A1* | 2/2010 | Smith | G06Q 20/102 705/40 |
| 2011/0161294 | A1* | 6/2011 | Vengerov | G06F 17/30581 707/637 |
| 2011/0314175 | A1* | 12/2011 | Thilagar | H04L 67/2847 709/232 |
| 2012/0209766 | A1* | 8/2012 | Kitchen | G06Q 20/04 705/40 |
| 2013/0268935 | A1* | 10/2013 | Paul | G06F 9/44552 718/100 |
| 2014/0047341 | A1* | 2/2014 | Breternitz | G06F 9/505 715/735 |
| 2014/0047342 | A1* | 2/2014 | Breternitz | G06F 9/5061 715/735 |
| 2014/0129731 | A1* | 5/2014 | Copsey | H04L 43/0858 709/233 |
| 2014/0181267 | A1* | 6/2014 | Wadkins | H04L 69/163 709/219 |
| 2014/0297799 | A1* | 10/2014 | Gordon | H04N 21/2402 709/217 |
| 2015/0009988 | A1* | 1/2015 | Lim | H04L 47/2458 370/389 |
| 2015/0088707 | A1* | 3/2015 | Drury | G06Q 40/12 705/30 |
| 2015/0156204 | A1* | 6/2015 | Resch | H04L 63/101 707/783 |
| 2015/0278397 | A1* | 10/2015 | Hendrickson | G06F 17/30958 707/798 |
| 2016/0071094 | A1* | 3/2016 | Krishnaiah | G06Q 20/363 705/66 |
| 2016/0092266 | A1* | 3/2016 | Bavishi | G06F 9/4856 718/1 |
| 2017/0118616 | A1* | 4/2017 | Kothari | H04W 4/24 |

OTHER PUBLICATIONS

"Age" (Def. 1C). Merriam-Webster.com. 2019. https://www.merriam-webster.com/dictionary/age (Nov. 19, 2019. (Year: 2019).*

"Revenue" (Def. 1). Merriam-Webster.com. 2019. https://www.merriam-webster.com/dictionary/revenue (Nov. 19, 2019. (Year: 2019).*

Harsh et al., "A Highly Available Generic Billing Architecture for Heterogenous Mobile Cloud Services", World Congress in Computer Science, Computer Engineering, and Applied Computing, 2014, Research Gate,10 pages.

Krishnaswamy, Dilip, "Bridging the digital divide with National Knowledge Centres", Forbes India, Blogs, Business & Strategy, Feb. 25, 2015, 5 pages, <http://forbesindia.com/blog/business-strategy/bridging-the-digital-divide-with-national-knowledge-centres/>.

U.S. Appl. No. 14/918,862 Entitled "Distributed and Localized Policy and Charging Control in Cellular Networks to Enable Route Flexibility", filed Oct. 21, 2015.

* cited by examiner

DATA RESILIENCY OF BILLING INFORMATION

BACKGROUND

The present invention relates generally to the field of automated electrical financial arrangement, and more particularly to business documentation.

Distributed functions virtualization ("DFV") allows distribution of virtual functions (e.g., applications, services, network functions) across cloud data centers and in-network data centers. Network functions virtualization ("NFV") relates to virtual network function ("VNF") deployment in a data center. Billing is a functional area within both NFV and DFV. During low connectivity events, a backlog of billing data can occur. Additionally, if a repository for billing information crashes, billing data not yet transmitted to a master site can be lost.

SUMMARY

According to an aspect of the present invention, there is a method, computer program product, and/or system that performs the following operations (not necessarily in the following order): (i) queuing a set of pending billing entries, wherein each pending billing entry in the set of pending billing entries has an age and a revenue value; (ii) determining a processing delay over a remote network; (iii) reordering, responsive to determining the processing delay, the set of pending billing entries to an ordered set of pending billing entries based, at least in part, on the age and the revenue value for each pending billing entry in the set of pending billing entries; (iv) replicating the set of pending billing entries over a local network; (v) determining an end of the processing delay; and (vi) transmitting, responsive to determining the end of the processing delay, a first subset of the set of pending billing entries over the remote network, wherein the first subset of the set of pending billing entries are based, at least in part, on the ordered set of pending billing entries. At least determining the processing delay over the remote network is performed by computer software running on computer hardware.

DETAILED DESCRIPTION

Figure 1:
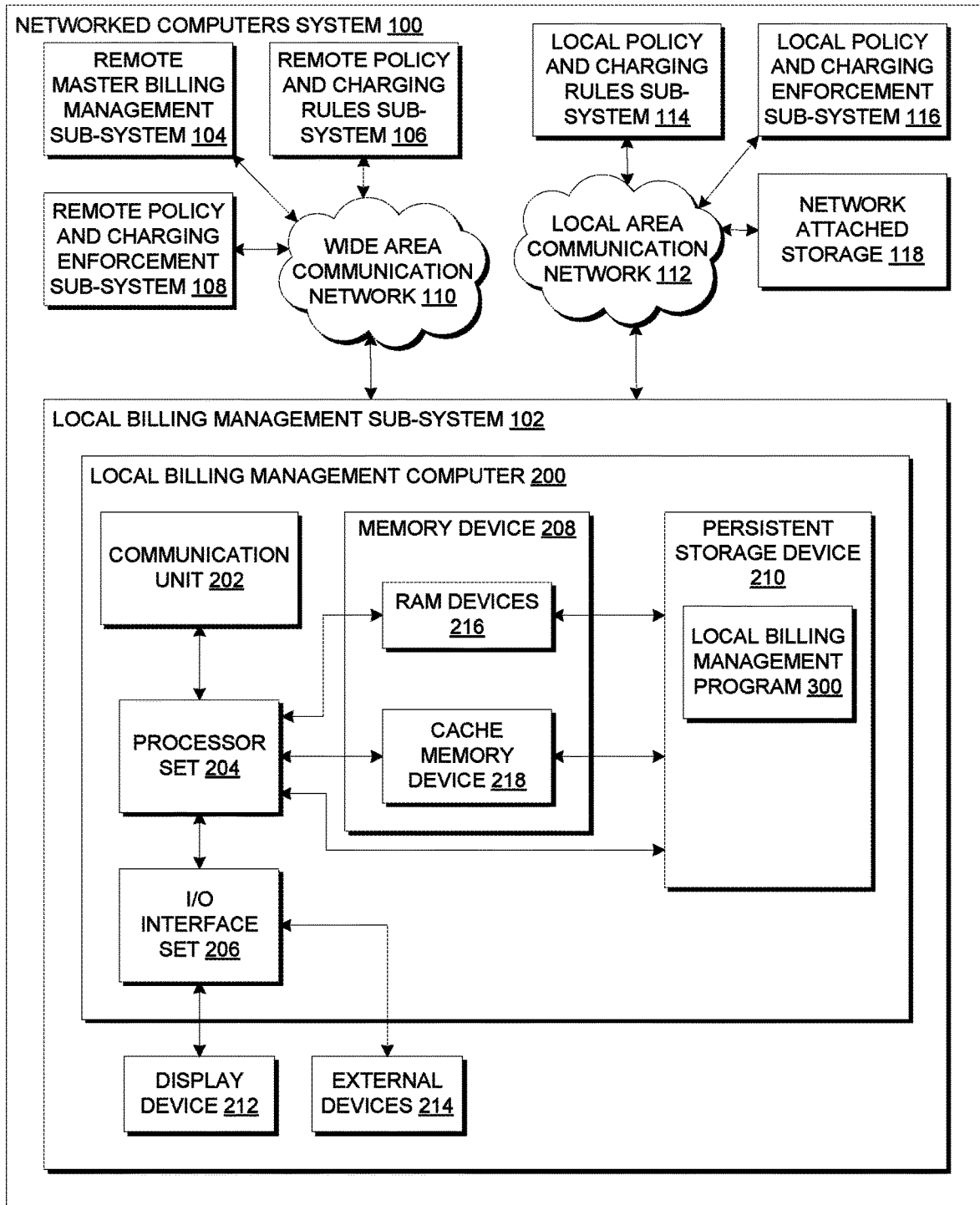
FIG. 1 is a block diagram view of a first embodiment of a system according to the present invention.

Managing transaction data during times of low network connectivity by organizing billing information for prioritized processing during periods of higher network connectivity. During low connectivity events, billing information is organized based, at least in part, on a combination of age and revenue to communicate important billing information upon reconnection. This Detailed Description section is divided into the following sub-sections: (i) Hardware and Software Environment; (ii) Example Embodiment; (iii) Further Comments and/or Embodiments; and (iv) Definitions.

I. HARDWARE AND SOFTWARE ENVIRONMENT

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: local billing management sub-system 102; remote master billing management sub-system 104; remote policy and charging rules sub-system 106; remote policy and charging enforcement sub-system 108; wide area communication network 110; local area communication network 112; local policy and charging rules sub-system 114; local policy and charging enforcement sub-system 116; and network attached storage 118. Local billing management sub-system 102 contains: local billing management computer 200; display device 212; and external devices 214. Local billing management computer 200 contains: communication unit 202; processor set 204; input/output (I/O) interface set 206; memory device 208; and persistent storage device 210. Memory device 208 contains: random access memory (RAM) devices 216; and cache memory device 218. Persistent storage device 210 contains: local billing management program 300.

Local billing management sub-system 102 is, in many respects, representative of the various computer sub-systems in the present invention. Accordingly, several portions of local billing management sub-system 102 will now be discussed in the following paragraphs.

Local billing management sub-system 102 may be a laptop computer, a tablet computer, a netbook computer, a personal computer (PC), a desktop computer, a personal digital assistant (PDA), a smart phone, or any programmable electronic device capable of communicating with client sub-systems via wide area communication network 110 and/or local area communication network 112. Local billing management program 300 is a collection of machine readable instructions and/or data that is used to create, manage, and control certain software functions that will be discussed in detail, below, in the Example Embodiment sub-section of this Detailed Description section.

Local billing management sub-system 102 is capable of communicating with other computer sub-systems via wide area communication network 110 and/or local area communication network 112. Wide area communication network 110 can be, for example, a local area network (LAN), a wide area network (WAN) such as the Internet, or a combination of the two, and can include wired, wireless, or fiber optic connections. In general, wide area communication network 110 can be any combination of connections and protocols that will support communications between local billing management sub-system 102 and client sub-systems. Local area communication network 112 can be, for example, a local area network (LAN), a wide area network (WAN) such as the Internet, or a combination of the two, and can include wired, wireless, or fiber optic connections. In general, local area communication network 112 can be any combination of connections and protocols that will support communications between local billing management sub-system 102 and client sub-systems.

Local billing management sub-system 102 is shown as a block diagram with many double arrows. These double arrows (no separate reference numerals) represent a communications fabric, which provides communications between various components of local billing management sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for local billing management sub-system 102; and/or (ii) devices external to local billing management sub-system 102 may be able to provide memory for local billing management sub-system 102.

Network attached storage 118 is computer readable storage media. In general, network attached storage 118 can include any suitable volatile or non-volatile computer readable storage media.

Local billing management program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Local billing management program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to local billing management sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with local billing management computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., local billing management program 300) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
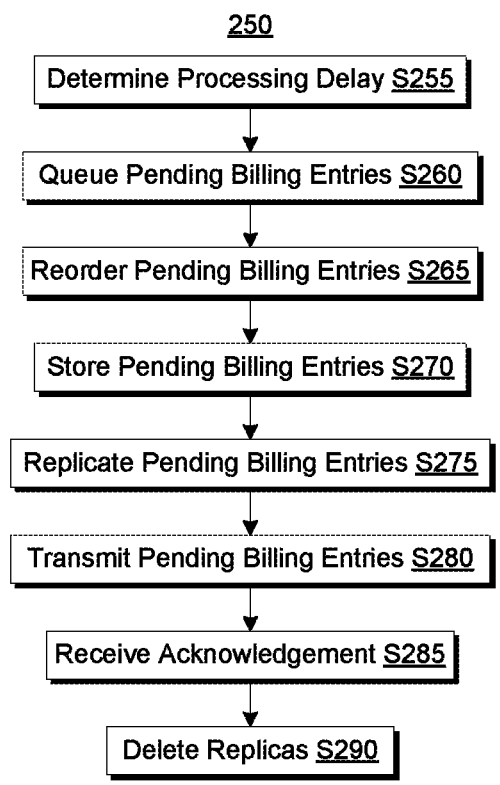
FIG. 2 is a flowchart showing a first embodiment method performed, at least in part, by the first embodiment system.
Figure 3:
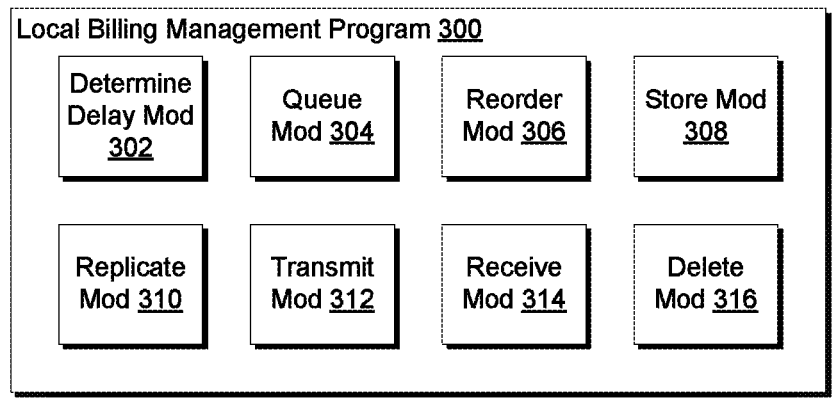
FIG. 3 is a block diagram view of a machine logic (e.g., software) portion of the first embodiment system.

FIG. 2 shows flowchart 250 depicting a method according to the present invention. FIG. 3 shows local billing management program 300, which performs at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where determine delay module ("mod") 302 determines a processing delay. In some embodiments, a processing delay is caused by an outage of a network. Alternatively, a processing delay is caused by increased traffic on a network. In some embodiments, determine delay mod 302 determines an existence of a processing delay. In some of these embodiments, determine delay mod 302 determines a processing delay over wide area communication network 110. In other embodiments, determine delay mod 302 determines an existence of a processing delay and a cause of the processing delay. In some embodiments, determine delay mod 302 determines a processing delay between local billing management sub-system 102 and at least one of: (i) remote master billing management sub-system 104; (ii) remote policy and charging rules sub-system 106; (iii) remote policy and charging enforcement sub-system 108; (iv) local policy and charging rules sub-system 114; and/or (v) local policy and charging enforcement sub-system 116. In further embodiments, determine delay mod 302 determines a processing delay is a temporary processing delay. In some of these embodiments, determine delay mod 302 determines a temporary processing delay is momentary. Alternatively, determine delay mod 302 determines a temporary processing delay is protracted. In alternative embodiments, determine delay mod 302 determines a processing delay is a permanent processing delay (e.g., a remote master billing management sub-system is permanently removed from service).

Processing proceeds to operation S260, where queue mod 304 queues a set of pending billing entries. In some embodiments, queue mod 304 queues a set of pending billing entries. In some of these embodiments, queue mod 304 queues all pending billing entries. Alternatively, queue mod 304 queues a subset of a set of pending billing entries. In some of these embodiments, queue mod 304 queues a subset of a set of pending billing entries based, at least in part, on a type of processing delay determined by determine delay mod 302 in operation S255. In other embodiments, queue mod 304 queues a set of pending billing entries based, at least in part, on a relative age of each pending billing entry in the set of pending billing entries. Alternatively, queue mod 304 queues a set of pending billing entries based, at least in part, on a relative revenue of each pending billing entry in the set of pending billing entries. In some embodiments, queue mod 304 queues a set of pending billing entries already at local billing management sub-system 102. Alternatively, queue mod 304 queues a set of pending billing entries accessible over local area communication network 112.

Processing proceeds to operation S265, where reorder mod 306 reorders a set of pending billing entries. In some embodiments of the present invention, reorder mod 306 reorders a set of pending billing entries. In some embodiments, reorder mod 306 reorders a set of pending billing entries based, at least in part, on a queue of the set of pending billing entries created by queue mod 304 in operation S260. In further embodiments, reorder mod 306 reorders a set of pending billing entries based, at least in part, on a revenue of each pending billing entry in the set of pending billing entries. In other embodiments, reorder mod 306 reorders a set of pending billing entries based, at least in part, on an age of each pending billing entry in the set of pending billing entries. In further alternative embodiments, reorder mod 306 reorders a set of pending billing entries based, at least in part, on a combination of a revenue and an age of each pending billing entry in the set of pending billing entries. In some embodiments, reorder mod 306 reorders a set of pending billing entries by giving priority to older pending billing entries in the set of pending billing entries. In alternative embodiments, reorder mod 306 reorders a set of pending billing entries by giving priority to newer pending billing entries in the set of pending billing entries. In some embodiments, reorder mod 306 reorders a set of pending billing entries by giving priority to higher revenue pending billing entries in the set of pending billing entries. In alternative embodiments, reorder mod 306 reorders a set of pending billing entries by giving priority to lower revenue pending billing entries in the set of pending billing entries. In some embodiments, reorder mod 306 gives more weight to an age of a pending billing entry than to a revenue of the pending billing entry. In other embodiments, reorder mod 306 gives more weight to a revenue of a pending billing entry than to an age of the pending billing entry. Alternatively, reorder mod 306 gives equal weight to a revenue of a pending billing entry and an age of the pending billing entry. In some embodiments, reorder mod 306 inserts new pending billing entries into the set of pending billing entries based, at least in part, on an age of the new pending billing entries and/or on a revenue of the new pending billing entries.

Processing proceeds to operation S270, where store mod 308 stores a set of pending billing entries. In some embodiments of the present invention, store mod 308 stores a set of pending billing entries. In other embodiments, store mod 308 stores a set of pending billing entries based, at least in part, on an order created by reorder mod 306 in operation S265. In further embodiments, store mod 308 stores a set of pending billing entries in a network attached storage ("NAS"). In some embodiments, store mod 308 stores a set of pending billing entries using local area communication network 112. In other embodiments, store mod 308 stores a set of pending billing entries on network attached storage 118.

Processing proceeds to operation S275, where replicate mod 310 replicates a set of pending billing entries. In some embodiments of the present invention, replicate mod 310 replicates a set of pending billing entries. In some embodiments, replicate mod 310 replicates all pending billing entries. In other embodiments, replicate mod 310 replicates a pseudo-randomly selected subset of a set of pending billing entries. In further embodiments, replicate mod 310 replicates a pseudo-randomly distributed subset of a set of pending billing entries. In alternative embodiments, replicate mod 310 replicates a set of pending billing entries across a set of local stores. In some of these embodiments, replicate mod 310 replicates a set of pending billing entries in a pseudo-random manner across a set of local stores. Alternatively, replicate mod 310 replicates a set of pending billing entries in a sequential manner across a set of local stores. In some embodiments, replicate mod 310 replicates a set of pending billing entries across a set of remote stores. In some of these embodiments, replicate mod 310 replicates a set of pending billing entries in a pseudo-random manner across a set of remote stores. Alternatively, replicate mod 310 replicates a set of pending billing entries in a sequential manner across a set of remote stores. In some embodiments, replicate mod 310 replicates a set of pending billing entries. Alternatively, replicate mod 310 replicates a subset of a set of pending billing entries. In some of these embodiments, replicate mod 310 replicates a subset of a set of pending billing entries based, at least in part, on a priority determined by reorder mod 306 in operation S265. Alternatively, replicate mod 310 replicates a subset of a set of pending billing entries based, at least in part, on a "first in, first out" basis. In alternative embodiments, replicate mod 310 replicates a subset of a set of pending billing entries based, at least in part, on a pseudo-random basis. In some embodiments of the present invention, replicate mod 310 replicates a set of pending billing entries over local area communication network 112. In other embodiments, replicate mod 310 replicates a set of pending billing entries on at least one of: (i) local policy and charging rules sub-system 114; and/or (ii) local policy and charging enforcement sub-system 116.

Processing proceeds to operation S280, where transmit mod 312 transmits a set of pending billing entries. In some embodiments of the present invention, transmit mod 312 determines a processing delay is resolved. In some embodiments, transmit mod 312 determines a processing delay determined by delay mod 302 in operation S255 is resolved. In other embodiments, transmit mod 312 transmits a set of pending billing entries. In further embodiments, transmit mod 312 transmits a set of pending billing entries based, at least in part, on an order determined by reorder mod 306 in operation S265. In other embodiments, transmit mod 312 determines an end of a processing delay. In some of these embodiments, transmit mod 312 dynamically determines an end of a processing delay. Alternatively, transmit mod 312 determines an end of a processing delay between local billing management sub-system 102 and at least one of: (i) remote master billing management sub-system 104; (ii) remote policy and charging rules sub-system 106; (iii) remote policy and charging enforcement sub-system 108;

(iv) local policy and charging rules sub-system 114; and/or (v) local policy and charging enforcement sub-system 116. In some embodiments, transmit mod 312 plans for an end of a processing delay. In some of these embodiments, transmit mod 312 plans for an end of a processing delay based, at least in part, on a predetermined policy. In other embodiments, transmit mod 312 transmits a set of pending billing entries. In alternative embodiments, transmit mod 312 transmits a subset of a set of pending billing entries. In some of these embodiments, transmit mod 312 transmits a subset of a set of pending billing entries based, at least in part, on a priority determined by reorder mod 306 in operation S265. In some embodiments, transmit mod 312 transmits a subset of a set of pending billing entries that have not been replicated. In some embodiments, transmit mod 312 transmits a set of pending billing entries over wide area communication network 110. In other embodiments, transmit mod 312 transmits a set of pending billing entries to at least one of: (i) remote master billing management sub-system 104; (ii) remote policy and charging rules sub-system 106; and/or (iii) remote policy and charging enforcement sub-system 108.

Processing proceeds to operation S285, where receive mod 314 receives an acknowledgement. In some embodiments of the present invention, receive mod 314 receives an acknowledgement. In some of these embodiments, receive mod 314 receives an acknowledgement from at least one of: (i) remote master billing management sub-system 104; (ii) remote policy and charging rules sub-system 106; (iii) remote policy and charging enforcement sub-system 108; (iv) local policy and charging rules sub-system 114; and/or (v) local policy and charging enforcement sub-system 116.

Processing terminates at operation S290, where delete mod 316 deletes a set of replicas. In some embodiments of the present invention, delete mod 316 deletes a set of replicas. In some of these embodiments, delete mod 316 deletes a set of replicas based, at least in part, on a set of pending billing entries transmitted by transmit mod 312 in operation S280. In some embodiments, delete mod 316 deletes a set of replicas responsive to receipt of an acknowledgement received by receive mod 314 in operation S285. In some embodiments of the present invention, delete mod 316 deletes a set of replicas from at least one of: (i) local policy and charging rules sub-system 114; and/or (ii) local policy and charging enforcement sub-system 116. In some embodiments of the present invention, delete mod 316 deletes a set of stored pending billing entries from network attached storage 118.

III. FURTHER COMMENTS AND/OR EMBODIMENTS

In some embodiments of the present invention, a set of billing agents are distributed across a set of data centers. In some embodiments, a set of billing agents enable high availability and/or high resiliency of local billing information. In some embodiments, a set of billing agents optimize selective transmission of billing information.

In some embodiments, billing information is ordered based, at least in part, on the amount of revenue associated with the billing data, so that the data with higher revenue is communicated earlier. Alternatively, billing information is ordered based, at least in part, on the age of the billing data, so that the oldest billing data may be communicated earlier. In further alternative embodiments, billing information is ordered based, at least in part, on revenue and age (e.g., based, at least in part, on a function of a product of revenue and age). In some embodiments, a coefficient is used to adjust the relative importance of revenue and age. In some embodiments, an age is multiplied by a coefficient. In some embodiments, a revenue is multiplied by a coefficient. In some embodiments, an age is multiplied by a first coefficient and the product is added to the product of a revenue and a second coefficient. In other embodiments, an age and a revenue are summed.

In some embodiments, the availability of bandwidth is determined based, at least in part, on a static policy that can specify time windows. Alternatively, the availability of bandwidth is determined based, at least in part, on dynamic bandwidth availability. In some embodiments, the most relevant information is communicated subject to the availability of the bandwidth and/or based, at least in part, on the relative ordering of the billing data.

In some embodiments, prioritization of policies may be used when consolidating billing information among a plurality of local policy and charging enforcement sub-systems based, at least in part, on constraints in the local network. Subsequently, based, at least in part, on constraints in the remote network, communication of information among a plurality of local policy and charging enforcement sub-systems can be optimized. Alternatively, such prioritization may be directly applied when transferring information directly among a plurality of local policy and charging enforcement sub-systems.

Some embodiments use light-weight instances of a local policy and charging enforcement sub-system. Alternatively, some embodiments use charging functions assisted by a billing scavenging sub-system. Some embodiments optimize dynamic network usage across billing data communication requirements for customer data flows. Some embodiments use relative prioritization of customer data flows, billing data communication based, at least in part, on dynamic requirements of each and/or network resource availability. Some embodiments ensure data resiliency of billing information in a distributed billing framework to enable optimized commitment of billing information based, at least in part, on dynamic data and network characteristics.

In some embodiments, billing data resides within a process in a virtualized network function ("VNF"). In further embodiments, billing data may be lost if it is not committed in real time or quasi-real time ("RT/QRT") because of multiple micro-billing systems introduced for route optimization in network function virtualization ("NFV"). In some embodiments, a billing data commit fails during a VNF outage. In some embodiments, a significant amount of billing data is communicated dependent upon on a dynamic network availability and cost due to dynamic VNF placements, which aggravates complexity. In some embodiments, a network bandwidth availability interferes with customer usage and billing data communication requirements. In some embodiments, a tradeoff decision is required to optimize billing data communication.

In some embodiments, a billing data resiliency is based, at least in part, on: (i) a set of dynamic network characteristics (e.g., load, bandwidth, latency); (ii) a set of dynamic user data characteristics (e.g., subscriber profiles); and/or (iii) a set of dynamic business data characteristics (e.g., premium, non-premium).

In some embodiments, a set of billing information for users is committed to a remote policy and charging rules sub-system and/or a remote policy and charging enforcement sub-system immediately when such information becomes available. In some embodiments, network constraints are based, at least in part, on an availability of connectivity via a remote network to a remote policy and charging rules sub-system and/or a remote policy and charging enforcement sub-system. Alternatively, network constraints are based, at least in part, on an availability of adequate network resources (e.g., bandwidth) to commit such information.

In some embodiments, communication of billing information can be delayed. In some embodiments, billing information is critical to operations and it is desirable to ensure high availability of such billing information when it is maintained locally. In some embodiments, local billing information is replicated such that one or more additional copies of billing information are stored in alternate resources corresponding to a local policy and charging rules sub-system and/or a local policy and charging enforcement sub-system that can be accessed over a local network, where such a local network is more available compared to a remote network.

In some embodiments, a local policy and charging rules sub-system and/or a local policy and charging enforcement sub-system commits information to a local NAS. In some embodiments, local billing information is replicated at a local policy and charging rules sub-system and/or a local policy and charging enforcement sub-system over local networks. In some embodiments, a billing scavenger retrieves information from an NAS to communicate to a remote policy and charging rules sub-system and/or a remote policy and charging enforcement sub-system. In some embodiments, a corresponding local policy and charging rules sub-system and/or a corresponding local policy and charging enforcement sub-system serves users in a nearby geographical region relative to the users being served by a remote policy and charging rules sub-system and/or a remote policy and charging enforcement sub-system. In some embodiments, a local policy and charging rules sub-system and/or a local policy and charging enforcement sub-system can serve as a duplicate for a second local policy and charging rules sub-system and/or a second local policy and charging enforcement sub-system.

In some embodiments, a local policy and charging rules sub-system and/or a local policy and charging enforcement sub-system may be introduced so that all billing information (e.g., policy information, prepaid call credits) is retrieved from the local policy and charging rules sub-system and/or local policy and charging enforcement sub-system, and any billing information is committed back to the local policy and charging rules sub-system and/or local policy and charging enforcement sub-system. Some embodiments use a deployment variant. In some embodiments, only some credits may be extended from remote a remote policy and charging rules sub-system and/or a remote policy and charging enforcement sub-system to a local policy and charging rules sub-system and/or a local policy and charging enforcement sub-system for specific users. Some embodiments allow a local policy and charging rules sub-system and/or a local policy and charging enforcement sub-system to serve in the absence of availability of connectivity to a remote policy and charging rules sub-system and/or a remote policy and charging enforcement sub-system. In some embodiments, as users move, an alternative local policy and charging rules sub-system and/or an alternative local policy and charging enforcement sub-system can serve users, if some fraction of the allowed credits remain with a remote policy and charging rules sub-system and/or a remote policy and charging enforcement sub-system. In some embodiments, available credits are not used more than once in the system. In some embodiments, unused credits are released by a local policy and charging rules sub-system and/or a local policy and charging enforcement sub-system to a remote policy and charging rules sub-system and/or a remote policy and charging enforcement sub-system. In some embodiments, multiple local policy and charging rules sub-systems and/or local policy and charging enforcement sub-systems serve a user. In some embodiments, a final commit from a local network can be delivered by a local policy and charging rules sub-system and/or a local policy and charging enforcement sub-system for billing. Alternatively, a local policy and charging rules sub-system and/or a local policy and charging enforcement sub-system can commit partial billing information directly to a remote policy and charging rules sub-system and/or a remote policy and charging enforcement sub-system if connectivity is available. In some embodiments, billing entries are tagged with information about a local policy and charging rules sub-system and/or a local policy and charging enforcement sub-system responsible, so that billing is not committed more than once in the system. In some embodiments, duplicate billing submissions are received and are deleted. In some embodiments, a local policy and charging rules sub-system and/or a local policy and charging enforcement sub-system is used based, at least in part, on previous knowledge of time-based availability of a remote policy and charging rules sub-system and/or a remote policy and charging enforcement sub-system, such as in a system based, at least in part, on limited connectivity available (such as satellite connectivity) with a remote policy and charging rules sub-system and/or a remote policy and charging enforcement sub-system.

In some embodiments, communication of billing information is batched and delayed so that such information is communicated when bandwidth is available. Some embodiments use billing information transfer optimization, which is a different prioritization technique to communicate information to a remote policy and charging rules sub-system and/or a remote policy and charging enforcement sub-system. In some embodiments, billing information is ordered based, at least in part, on the amount of revenue associated with the billing data, so that the data with higher revenue is communicated earlier. Alternatively, billing information is ordered based, at least in part, on the age of the data so that the oldest billing data may be communicated earlier.

Some embodiments provide high availability of billing information in a distributed billing scenario with the use of a local policy and charging rules sub-system and/or a local policy and charging enforcement sub-system. Some embodiments consolidate billing information with a remote policy and charging rules sub-system and/or a remote policy and charging enforcement sub-system or with a local policy and charging rules sub-system and/or a local policy and charging enforcement sub-system, with prioritization of billing information based, at least in part, on revenue and age of the data, and the dynamic availability of bandwidth on the remote network and/or the local network.

Some embodiments provide data resiliency of billing information in a distributed billing system by duplicating local billing agent state information. In some embodiments, the distributed billing system is implemented using a local policy and charging rules sub-system and/or a local policy and charging enforcement sub-system that communicates with a remote policy and charging rules sub-system and/or a remote policy and charging enforcement sub-system. In some embodiments, the data resiliency of billing information is provided by replication of billing information in a local policy and charging rules sub-system and/or a local policy and charging enforcement sub-system. Some embodiments further optimize the commit of billing information based, at least in part, on dynamic data and network characteristics. In some embodiments, the dynamic data characteristics can represent the age of the billing information or the revenue associated with the billing information. In some embodiments, the revenue associated with the billing information can be derived based, at least in part, on user billing profiles or business account profiles. In some embodiments, the network characteristics can include the availability of bandwidth of communicating billing information. In some embodiments, the bandwidth for communicating billing information is reduced based, at least in part, on the need to transmit user traffic. In some embodiments, the bandwidth availability is specified using a static policy of time windows and their associated bandwidth. In some embodiments, the bandwidth availability is determined based, at least in part, on the dynamic load in the network. In some embodiments, a billing scavenger agent is used to recover any information that was committed to a local database but not communicated to a remote billing agent. Some embodiments communicate billing information stored in a local database at an appropriate time.

Some embodiments enable high availability or resiliency of billing state information, or the ability to selectively communicate billing information based, at least in part, on age and/or revenue associated with the billing data combined with bandwidth availability considerations. Some embodiments have local lightweight replicated micro-billing agents and data to enable resiliency in communication of such information in a distributed billing framework, and to consider network availability and bandwidth availability to communicate such information, and to prioritize the communication of such billing information in a distributed billing framework based, at least in part, on the value associated with the data.

Some embodiments replicate information and program logic associated with a local policy and charging rules sub-system and/or a local policy and charging enforcement sub-system close to an edge node in a communication and/or enterprise infrastructure, where the micro-billing entity communicates with a remote policy and charging rules sub-system and/or a remote policy and charging enforcement sub-system. Some embodiments reorder billing information based, at least in part, on age of the data and revenue priority associated with the data, to deliver the most important billing data when connectivity or network resources are available to receive such billing data. Some embodiments use a billing scavenger to retrieve replicated billing information. Some embodiments consider network availability to communicate information.

IV. DEFINITIONS

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

The term "real time" (and the adjective "real-time") includes any time frame of sufficiently short duration as to provide reasonable response time for information processing as described. Additionally, the term "real time" (and the adjective "real-time") includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A computer implemented method comprising:
   queuing a set of pending billing entries for transmittal over a remote network, each pending billing entry in the set of pending billing entries having an age and a revenue value;
   determining that a time of decreased network bandwidth availability currently exists based on a determined processing delay over the remote network;
   during the time of decreased network bandwidth availability and responsive to determining the processing delay:
      generating a list of prioritized transactions for a plurality of transactions based on a reordering of the set of pending billing entries to form an ordered set of pending billing entries based, at least in part, on the age and the revenue value for each pending billing entry in the set of pending billing entries;
      generating a replicated set of transactions by replicating the set of pending billing entries over a local network based, in part, on a dynamic availability of bandwidth on one or both of the remote network and the local network and the list of prioritized transactions;
      determining an end of the processing delay; and
      transmitting, responsive to determining the end of the processing delay, a first subset of the replicated set of transactions over the remote network, wherein the first subset of the replicated set of transactions are selected for transmission based, at least in part, on the ordered set of pending billing entries and the list of prioritized transactions;
   wherein at least the determining the processing delay over the remote network is performed by computer software running on computer hardware.

2. The method of claim 1, further comprising:
   receiving a second set of pending billing entries, wherein each pending billing entry in the second set of pending billing entries has a second age and a second revenue value; and
   adding the second set of pending billing entries to the ordered set of pending billing entries based, at least in part, on the second age and the second revenue value for each pending billing entry in the second set of pending billing entries.

3. The method of claim 1, further comprising:
   receiving an acknowledgement of receipt of the first subset of the set of pending billing entries over the remote network;
   storing the set of pending billing entries in a local storage; and
   deleting, responsive to receiving the acknowledgement of receipt:
      the set of pending billing entries replicated over the local network, and
      the set of pending billing entries stored in the local storage.

4. The method of claim 1, wherein the ordered set of pending billing entries are transmitted to a master billing management sub-system.

5. The method of claim 1, wherein the set of pending billing entries are replicated to a local policy and charging enforcement sub-system.

6. The method of claim 1, wherein:
   the ordered set of pending billing entries is based on a priority for each pending billing entry in the set of pending billing entries; and
   a first priority of a first pending billing entry in the set of pending billing entries is based on a sum of:
      a first age for the first pending billing entry multiplied by a first coefficient, and
      a first revenue value for the first pending billing entry multiplied by a second coefficient.

7. The method of claim 1, wherein determining the end of the processing delay is performed on a dynamic basis and the revenue value is derived based, at least in part, on user billing profiles or business account profiles.

8. A computer program product comprising:
   a computer readable storage medium device having stored thereon:
      first instructions executable by a device to cause the device to queue a set of pending billing entries for transmittal over a remote network, each pending billing entry in the set of pending billing entries having an age and a revenue value;

second instructions executable by the device to cause the device to determine that a time of decreased network bandwidth availability currently exists based on a determined processing delay over the remote network;

third instructions executable by the device to cause the device to respond to the time of decreased network bandwidth availability and a determination of the processing delay by:

generating a list of prioritized transactions for a plurality of transactions based on a reordering of the set of pending billing entries to form an ordered set of pending billing entries based, at least in part, on the age and the revenue value for each pending billing entry in the set of pending billing entries;

generating a replicated set of transactions by replicating the set of pending billing entries over a local network based, in part, on a dynamic availability of bandwidth on one or both of the remote network and the local network and the list of prioritized transactions;

determining an end of the processing delay; and transmitting, responsive to determining the end of the processing delay, a first subset of the replicated set of transactions over the remote network, wherein the first subset of the replicated set of transactions are selected for transmission based, at least in part, on the ordered set of pending billing entries.

9. The computer program product of claim 8, further comprising:

fourth instructions executable by the device to cause the device to receive a second set of pending billing entries, wherein each pending billing entry in the second set of pending billing entries has a second age and a second revenue value; and fifth instructions executable by the device to cause the device to add the second set of pending billing entries to the ordered set of pending billing entries based, at least in part, on the second age and the second revenue value for each pending billing entry in the second set of pending billing entries.

10. The computer program product of claim 8, further comprising:

fourth instructions executable by the device to cause the device to receive an acknowledgement of receipt of the first subset of the set of pending billing entries over the remote network;

fifth instructions executable by the device to cause the device to store the set of pending billing entries in a local storage; and sixth instructions executable by the device to cause the device to delete, responsive to receiving the acknowledgement of receipt:
  the set of pending billing entries replicated over the local network, and
  the set of pending billing entries stored in the local storage.

11. The computer program product of claim 8, wherein the ordered set of pending billing entries are transmitted to a master billing management sub-system.

12. The computer program product of claim 8, wherein the set of pending billing entries are replicated to a local policy and charging enforcement sub-system.

13. The computer program product of claim 8, wherein:

the ordered set of pending billing entries is based on a priority for each pending billing entry in the set of pending billing entries; and a first priority of a first pending billing entry in the set of pending billing entries is based on a sum of:
  a first age for the first pending billing entry multiplied by a first coefficient, and
  a first revenue value for the first pending billing entry multiplied by a second coefficient.

14. The computer program product of claim 8, wherein fifth instructions to determine the end of the processing delay are performed on a dynamic basis.

15. A computer system comprising:

a processor set; and a computer readable storage medium device;

the processor set being structured, located, connected, and/or programmed to execute instructions stored on the computer readable storage medium; and the instructions include:

first instructions executable by a device to cause the device to queue a set of pending billing entries for transmittal over a remote network, each pending billing entry in the set of pending billing entries having an age and a revenue value;

second instructions executable by the device to cause the device to determine that a time of decreased network bandwidth availability currently exists based on a determined processing delay over the remote network;

third instructions executable by the device to cause the device to respond to the time of decreased network bandwidth availability and a determination of the processing delay by:

generating a list of prioritized transactions for a plurality of transactions based on a reordering of the set of pending billing entries to form an ordered set of pending billing entries based, at least in part, on the age and the revenue value for each pending billing entry in the set of pending billing entries;

fourth instructions executable by the device to cause the device to generate a replicated set of transactions by replicating the set of pending billing entries over a local network based, in part, on a dynamic availability of bandwidth on one or both of the remote network and the local network and the list of prioritized transactions;

fifth instructions executable by the device to cause the device to determine an end of the processing delay; and sixth instructions executable by the device to cause the device to transmit, responsive to determining the end of the processing delay, a first subset of the replicated set of transactions over the remote network, wherein the first subset of the replicated set of transactions are selected for transmission based, at least in part, on the ordered set of pending billing entries.

16. The computer system of claim 15, further comprising:

fourth instructions executable by the device to cause the device to receive a second set of pending billing entries, wherein each pending billing entry in the second set of pending billing entries has a second age and a second revenue value; and fifth instructions executable by the device to cause the device to add the second set of pending billing entries to the ordered set of pending billing entries based, at least in part, on the second age and the second revenue value for each pending billing entry in the second set of pending billing entries.

17. The computer system of claim 15, further comprising:
fourth instructions executable by the device to cause the device to receive an acknowledgement of receipt of the first subset of the set of pending billing entries over the remote network;
fifth instructions executable by the device to cause the device to store the set of pending billing entries in a local storage; and
sixth instructions executable by the device to cause the device to delete, responsive to receiving the acknowledgement of receipt:
the set of pending billing entries replicated over the local network, and
the set of pending billing entries stored in the local storage.

18. The computer system of claim 15, wherein the ordered set of pending billing entries are transmitted to a master billing management sub-system.

19. The computer system of claim 15, wherein the set of pending billing entries are replicated to a local policy and charging enforcement sub-system.

20. The computer system of claim 15, wherein:
the ordered set of pending billing entries is based on a priority for each pending billing entry in the set of pending billing entries; and
a first priority of a first pending billing entry in the set of pending billing entries is based on a sum of:
a first age for the first pending billing entry multiplied by a first coefficient, and
a first revenue value for the first pending billing entry multiplied by a second coefficient.

* * * * *